July 27, 1937.  G. E. LAMB  2,088,110

TRANSMISSION MECHANISM

Filed March 5, 1934  4 Sheets-Sheet 1

INVENTOR
GEORGE E. LAMB
BY
Cook & Robinson
ATTORNEY

July 27, 1937.　　　　G. E. LAMB　　　　2,088,110
TRANSMISSION MECHANISM
Filed March 5, 1934　　　　4 Sheets-Sheet 2
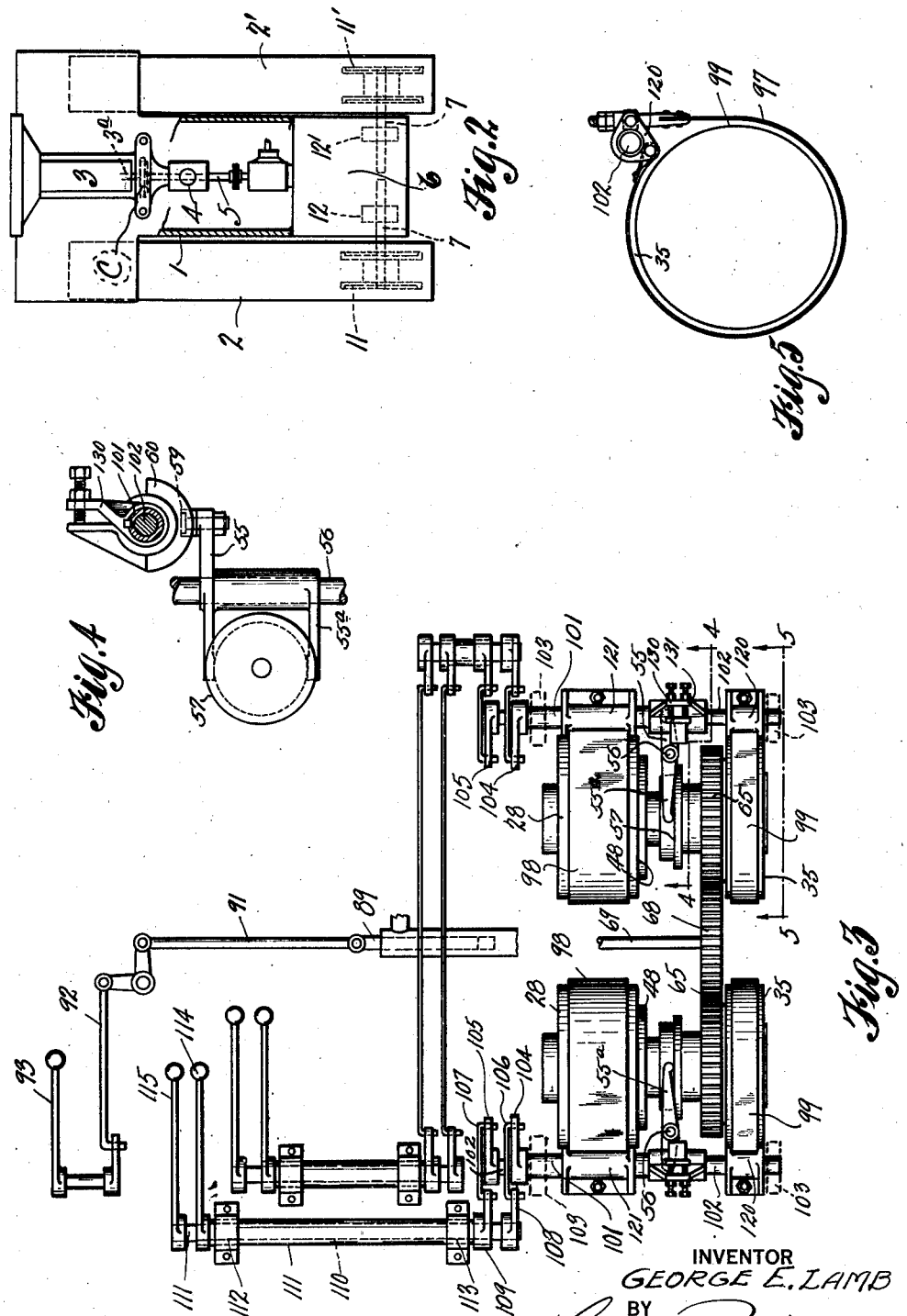
INVENTOR
GEORGE E. LAMB
BY
Cook & Robinson
ATTORNEY July 27, 1937.  G. E. LAMB  2,088,110
TRANSMISSION MECHANISM
Filed March 5, 1934  4 Sheets-Sheet 3
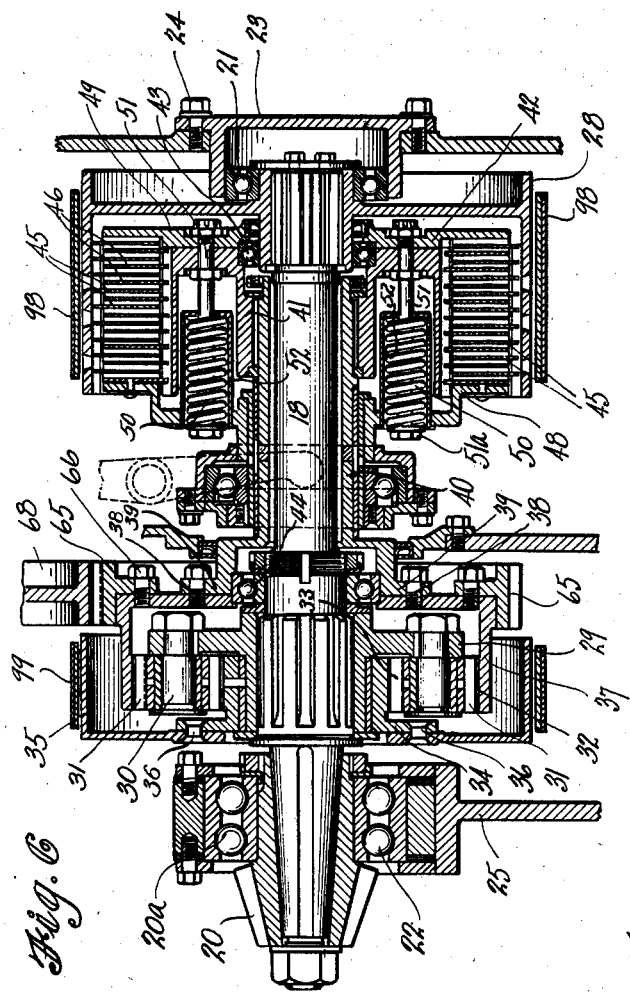
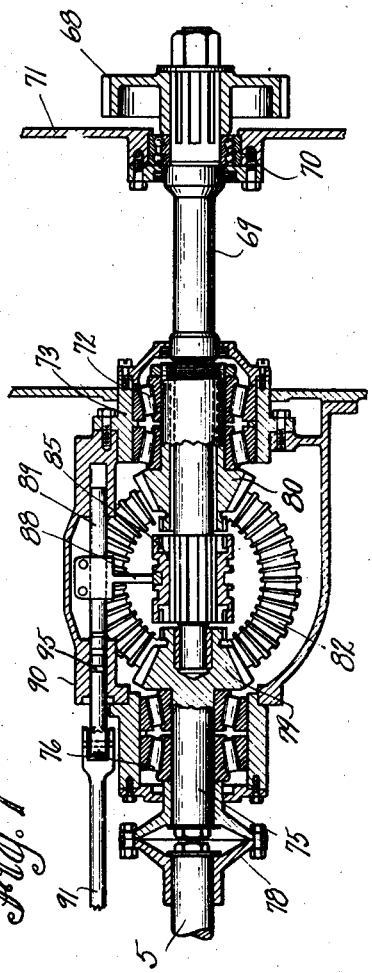
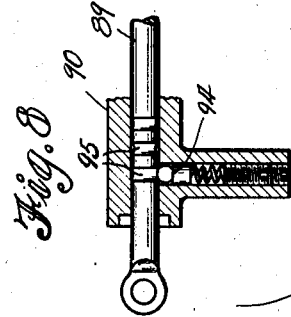
INVENTOR
GEORGE E. LAMB
BY
Cook & Robinson
ATTORNEY

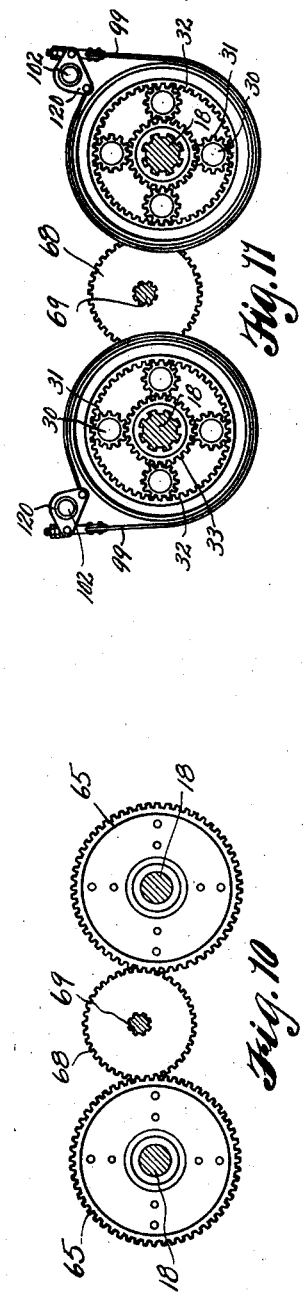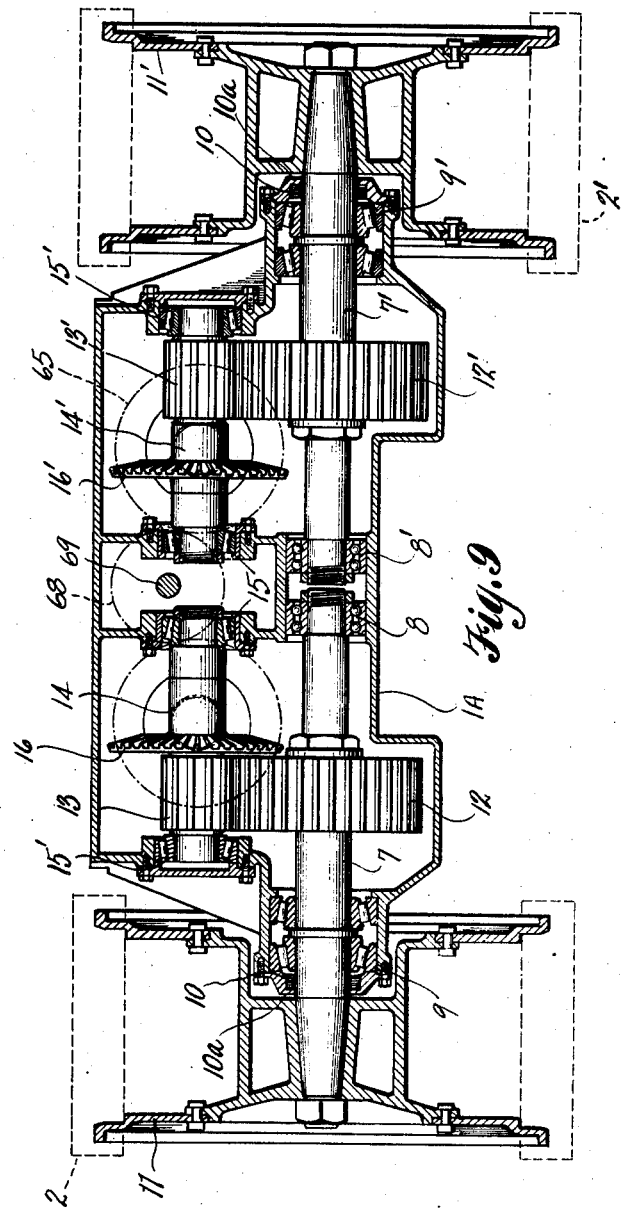

Patented July 27, 1937

2,088,110

UNITED STATES PATENT OFFICE 2,088,110

TRANSMISSION MECHANISM

George E. Lamb, Hoquiam, Grays Harbor, Wash.

Application March 5, 1934, Serial No. 714,029

8 Claims. (Cl. 180—9.2)

This invention relates to power transmission mechanism, and more particularly to a power transmission and steering gear as applied to tractors of the track laying type; it being the principal object of this invention to provide a transmission mechanism that is especially suitable for high speed tractors of super-power and through which mechanism power may be transmitted from an engine to the two tracks evenly and selectively in various amounts, and also may, without loss of power, be applied to the tracks to cause them to be driven at the same or at different speeds independently of each other or permitted to run free at the same speed or to run free independently of each other.

More particularly, the present invention resides in the provision of a power transmission mechanism, both for driving and steering purposes, utilizing in connection with each track, a unitary assembly comprising a clutch and brake system in combination with a planetary gear system, together with suitable controls whereby the clutch and brake system may be used to effect either a direct driving connection with its track, or to provide for an increase of power at a reduced driving speed through the planetary system. Furthermore, it is also a provision that the planetary system shall permit of a reduction of speed of its track by varying degrees to approximately sixty-two per cent of its normal speed with a corresponding increase of power.

It is also an object of this invention to provide suitable controls whereby the mechanisms as associated with the two tracks may be selectively manipulated for ordinary steering or for making gradual or pivot turns as well as for application of full power for driving at various speeds.

Other objects of the invention reside in the improved details of construction and combination of parts and in their mode of operation as will hereinafter be described.

In accomplishing these and other objects of the invention I have provided the improved details of construction, the preferred forms of which are illustrated in the accompanying drawings, wherein.

Fig. 2 is a diagrammatic view illustrating the preferred manner of assembling the present transmission mechanism with respect to the frame, engine and tracks of a tractor.

Fig. 3 is a diagrammatic illustration of the arrangement of controls for the dual clutch, brake and planetary systems of the transmission mechanism.

Fig. 4 is a cross sectional detail as on line 4—4 in Fig. 3.

Fig. 5 is a side view of a brake band and drum as seen from the vertical plane of line 5—5 in Fig. 3.

Fig. 6 is a longitudinal section of one of the clutch, brake and planetary systems associated with each track.

Fig. 7 is a sectional view of the reversing gear mechanism associated with the driving shaft.

Fig. 8 is a sectional detail of the locking means for the reversing clutch.

Fig. 9 is a transverse section in the vertical axial plane of the track driving shafts, as on line 9—9 in Fig. 1.

Fig. 10 is a cross section on line 10—10 in Fig. 1.

Fig. 11 is a cross section on line 11—11 in Fig. 1.

Figure 1:
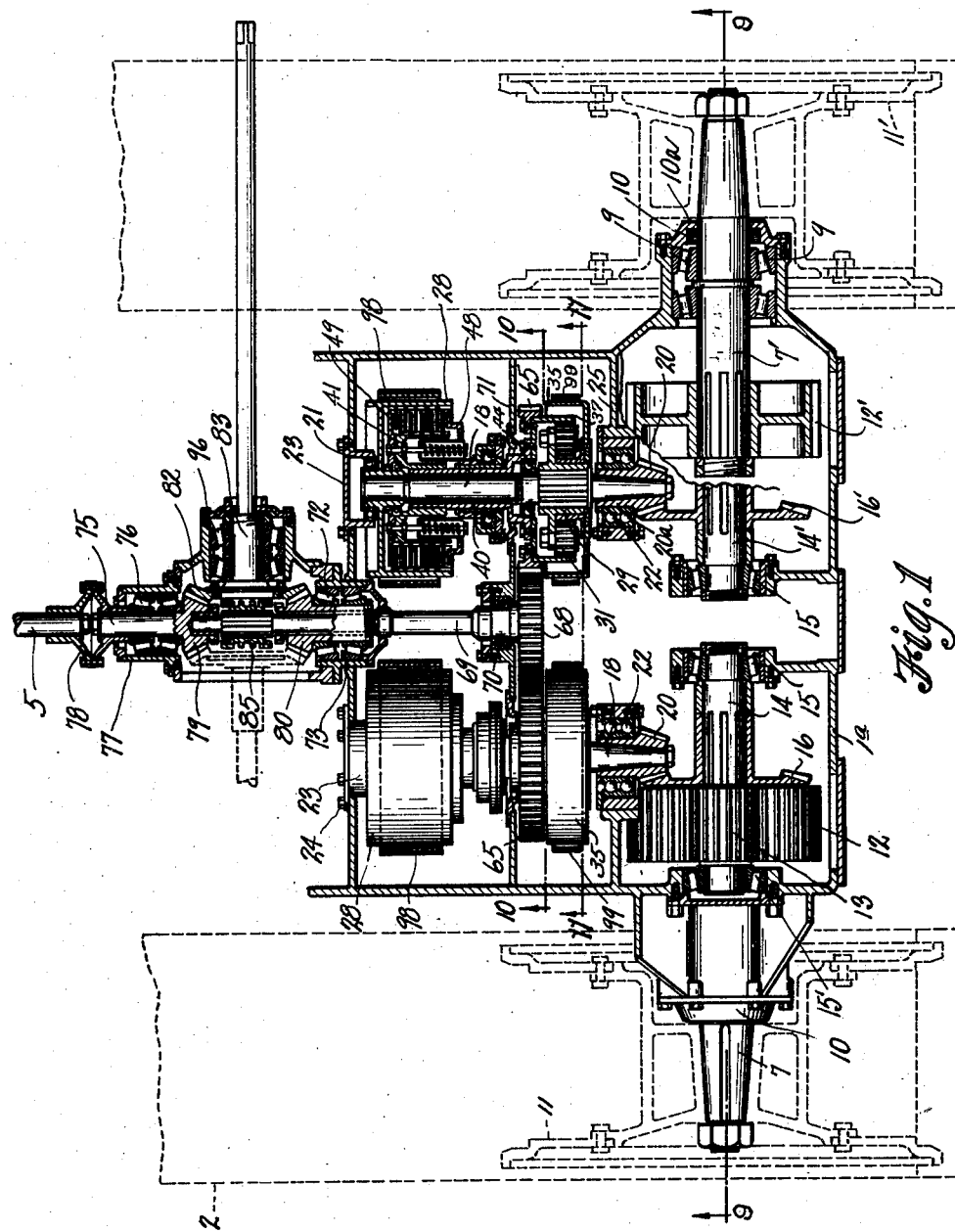
Fig. 1 is a plan view of the transmission mechanism embodied by the present invention, shown partly in section for better illustration.

Referring more in detail to the drawings—

First, with reference to Fig. 2, this view diagrammatically illustrates, in plain, a common type of tractor of the track laying type having a frame, or chassis, 1 supported at opposite sides by the tracks 2 and 2'. These tracks are operatively connected through the present transmission mechanism, as presently described, with an engine 3. The engine is mounted in the chassis in any suitable manner and as here shown has its drive shaft 3a operatively connected through a releasable clutch C and suitable change speed transmission means designated at 4 with a shaft 5 which transmits power to the track 2 and 2' through the transmission mechanism embodied by this invention and which is designated in its entirety by reference numeral 6.

The present transmission mechanism is contained, as seen in Figs. 1 and 9, in a substantially constructed, oil tight, cast steel housing 1A which, in its present embodiment forms a part of the chassis, but which might be separate from but rigidly secured within the frame. Within the rear end portion of the housing 1A, as seen best in Fig. 9, are two track driving shafts 7 and 7' rotatably supported in axial alinement. At their inner ends these shafts are revolubly mounted, respectively, in bearings 8 and 8' and they extend outwardly from opposite side walls of the housing through double sets of supporting bearings 9 and 9' and through packed openings, as at 10, in bearing cover plates 10a which are fixed to the housing. At their outer ends the shafts 7 and 7' mount sprocket wheels 11 and 11', which may be keyed, or otherwise secured thereon, and about which the track belts 2 and 2' are operatively extended to be driven thereby.

Without going into a detailed explanation, it will be stated as explanatory, that the track belts 2 and 2' extend about suitable guiding and supporting wheels carried on frames pivotally mounted at the sides of the tractor and they are driven, respectively, by the sprocket wheels 11—11'. If the tracks are driven at the same speed, the vehicle will move straight ahead, and if at different speeds, the vehicle will turn from the straight line travel. Through this manipulation of the tracks the tractor is driven and steered.

Splined or otherwise fixed on the shafts 7—7' within the housing 1A, are driving gears 12 and 12' meshing, respectively, with driving pinions 13 and 13' keyed on short shafts 14 and 14' arranged in axial alinement, parallel with and above the shafts 7 and 7'. These shafts 14—14' are mounted rotatably in bearings 15 and 15' and are adapted to turn independently of each other. Keyed or otherwise fixed on the shafts 14 and 14', respectively, are beveled gears 16 and 16' and as will be observed by reference to Fig. 9, these gears are faced in the same direction.

Each of the tracks is driven by the reducing mechanism above described, through a unitary clutch and brake system in connection with a planetary system, one of which is illustrated in Fig. 6. Fig. 1 shows the two units as arranged in parallel relation at opposite sides of the longitudinal central line of the tractor and of the housing 1A.

The clutch, brake and planetary system associated with each track is identical to that of the other. Therefore, it is to be understood that the following description which will be directed particularly to the device as seen in Fig. 6, applies equally to the other unit.

The unit as seen in Fig. 6 includes a central shaft 18, which, in the transmission assembly is mounted horizontally at a right angle with respect to its corresponding shaft 14, and is equipped at its rearward end with a beveled pinion 20 meshing with the beveled driving gear 16 on shaft 14. In the claims terminating the specification, the shafts 18 will be identified as the transmission shafts.

The shaft 18 is the support for the unit and it is revolubly contained, at its forward end, in a bearing 21 and at its rear end, in a bearing 22. The bearing 21 is a ball bearing fitted in a carrier 23 applied within an opening in the forward end wall of the housing 1A and secured to the wall by bolts 24 which may be removed to permit outward withdrawal of the carrier. The bearing 21 is fitted about the hub portion of a brake drum that is revoluble about that end of the shaft, as presently described. The bearing 22 is a double ball bearing and is secured within a seat provided in a web or wall 25 cast within the housing 1A. This bearing is fitted about the hub portion 20a of the beveled pinion 20 that is keyed to that end of the shaft 18.

Splined to the forward end of the shaft 18 is a brake drum 28 and splined on the shaft, near its rearward end, is a spider 29 in which a plurality of spindles 30 are mounted for the support of the intermediate gears 31 of a planetary gear system, including also an outer ring gear 32 and a central gear 33; the latter being revoluble about the hub portion of the spider 29 and having a lateral peripheral flange 34 whereby it mounts a brake drum 35 that is attached to the flange by rivets or the like, as at 36.

The outer gear 32 of the planetary system is formed interiorly of a drum 37 that is fixed by bolts 38 to the end flange 39 of a sleeve 40 that is revoluble about the shaft 18 and splined within and to the hub portion 41 of a clutch spider 42 arranged cooperatively within the brake drum 28 which serves as a part of the clutch system.

The sleeve 40 is supported revolubly about and free of the shaft 18 at one end by ball bearings 43 applied about the inner end of the hub of the drum and within the adjacent end of the clutch head, or spider 42 splined on the sleeve. At its other end the sleeve is likewise supported by ball bearings 44 fitted to the shaft adjacent the spider of the planetary system, and within the end of the sleeve.

The clutch mechanism associated with the drum 28 comprises the clutch head or spider 42 and a plurality of friction disks 45 and 46 alternately arranged about the spider and slidably keyed respectively to the spider and to the drum as in the usual friction disk clutch. A clutch plate 48 overlies the series of disks in adjustable relation to an oppositely arranged plate 49 fixed to the inner end of the clutch spider. Normally the clutch is held set so that the shaft 18 will be driven with the sleeve 40. The means for setting the clutch comprises a plurality of coiled springs 50 mounted on bolts 51 fixed in the clutch spider. At their outer ends the springs seat against the bolt heads 51a and at their inner ends bear against the ends of sockets 52 set within the plate 48; the springs being confined under compression so as to exert pressure against plate 48 that will clamp the clutch disks together and thus effect a driving connection between the clutch spider and drum 28.

To release the clutch, the plate 48 is shifted outwardly away from the disks thus to release them from frictional contact and permit the sleeve 40 to rotate while the drum 28 is held against rotation. The clutch shifting means, as seen in Fig. 4, comprises a lever 55 pivoted on a vertical pin 56 fixed in the housing; one end of the lever having a yoke 55a bearing against a collar 57 that is fastened to the hub portion of the clutch plate 48, and the other end being equipped with a cam follower 59 engaging a cam 60 of a shifting mechanism, seen in Figs. 3 and 4, and which later will be described in connection with the control system. On rotative movement of the cam 60, the lever 55 is actuated to retract the plate 48 to release the clutch.

Power is applied, for driving the shaft 18, through a gear 65 that is fixed by bolts 66 to the outer gear of the planetary system.

As seen in Fig. 1, the two clutch, brake and planetary systems are arranged in parallel, spaced relation with their respective driving gears 65 in the same vertical plane. A driving gear 68 is keyed on the end of an engine driven shaft 69 and meshes with and drives both gears 65. The shaft 69 is revolubly mounted, at its rear end, in a bearing 70 disposed within a seat provided for it in a transverse partition wall 71 dividing the housing 1A. At its forward end, it is supported in bearings 72 in a housing 73 fitted on an opening in the forward end wall of the housing 1A. The shaft 69 is adapted to be driven by a direct connection with the engine shaft 5 or through a reversing gear mechanism disclosed best in Figs. 1 and 7.

The driving and reversing mechanism above mentioned includes a short shaft 75 that is mounted in axial alinement with shaft 69 as a continuation thereof. It is revolubly mounted in bearings 76 fitted in the forward end portion of a housing 77 enclosing the gearing and fixed to the housing 1A. The forward end of shaft 75 has a driving connection, as at 78, with shaft 5 and at its inner end has a beveled pinion 78 fixed thereon. A similar beveled pinion 80 is revoluble on shaft 69 and has its hub revolubly contained within the bearings 72. An intermediate, or reversing beveled gear wheel 82 is mounted by a shaft 83 in mesh with both gears 79 and 80. There is also a clutch sleeve 85 slidably keyed on shaft 69 between the beveled pinions 79 and 80 and this may be shifted from a neutral position into clutching relation with either the gear 79 or 80. When the clutch sleeve is engaged with gear 79, it effects a direct connection between shafts 5 and 69 for forward driving of the tractor. When engaged with gear 80, it effects a reverse driving connection between gear shaft 75 and shaft 69 by reason of the gear 80 being then locked to shaft 69 and driven in a direction opposite to shaft 75 through the reversing gear 82. The means for shifting the clutch sleeve, as seen in Fig. 7, comprises a yoke 88 fixed on a shift rod 89 longitudinally slidable in guides of a coverplate 90 applied to housing 77. This rod is connected at its outer end to a shifting rod 91 which, as seen in Fig. 3, is connected by linkage 92 with a shifting lever 93. A yieldable latch 94 is associated with rod 91 to seat in notches 95 formed in the rod, thereby to yieldingly hold the rod at different positions for neutral, forward or reverse driving.

As an added feature of construction, the short shaft 83 which mounts the reversing gear 82 is keyed to the gear and is revolubly contained in a bearing 96 in the housing 77. This shaft is shown as being extended from the housing as a power take off shaft for driving various devices which might be associated with the tractor. A similar gear and power take off might also be applied to the opposite side of the housing, as is indicated in dotted lines in Fig. 1.

The control system for the two clutch, brake and planetary systems is shown diagrammatically in Fig. 3 with details thereof in Figs. 4 and 5, but before describing the controls, it will be stated that suitable brake bands 98 are applied about each of the drums 28 and likewise brake bands 99 are applied to each of the drums 35 of the planetary systems. The controls for the mechanisms, as associated with each track, are the same, therefore, the description as applied to one will apply equally to the other.

As seen in Fig. 3, a tubular shaft 101 with a shaft 102 internally contained and rotatably mounted therein is supported in bearings 103 in the housing 1A parallel with the axis of the drums 28 and 35. The forward ends of these shafts extend from the housing where they are equipped, respectively, with crank arms 104 and 105, connected respectively by links 106 and 107 with crank arms 108 and 109 fixed on the ends of a shaft 110 and a tubular shaft 111 containing the shaft 110. The shaft 110 is revolubly supported in bearings as at 112—113. These two shafts 110—111 may be rotatably adjusted independently of each other by levers 114 and 115 fixed thereto and means may be associated with these shaft levers to hold them at set positions.

At their inner ends the shafts 102 are equipped with toggles 120 to which the ends of the brake bands 99 of the planetary systems are attached. Likewise, on shafts 101 are toggles 121 to which the brake bands of the drums 28 are attached. With this mechanism the brake bands may be set tight about their respective drums to prevent their rotation, or the bands may be loosened to permit free rotation of the drums. It is necessary, however, in the desired operation of each system, that the clutch associated therewith be released when either of the drums is held against rotation. Therefore, I have provided the cam 60, previously mentioned, and which is floating on the shaft 102 in operative engagement with cam follower 59 of lever 55. On the shafts 101 and 102 are arms 130 and 131, respectively, adapted on rotation of either shaft to rotatably actuate the cam 60 to shift the lever 55 for releasing the clutch.

Assuming that the device is so constructed, it is readily observed that the shaft 5 delivers power to shaft 75 which, in turn, transmits power directly, or through the reversing gear mechanism, to the shaft 69, and this, through the gear 68, drives the gears 65—65 of the two track driving systems.

For normal, straight ahead operation of the tractor, the driven shaft 75 would be connected by the clutch sleeve 85 directly with the shaft 69 and this would distribute the power evenly through gear 68 and gears 65—65 to the two tracks. For this direct drive, all brake bands are released but the clutches are set. Therefore, power applied to the gears 65 is transmitted to the sleeves 40, then through the clutches to shafts 18 and from these shafts through the gears 20, 16, 13 and 12 of each system to the shafts 7 and 7' and thus to the tracks. Various direct driving speeds may be obtained through the change speed gearing designated at 4 in Fig. 2.

For reverse driving, it is only necessary to shift the clutch sleeve 85 to disengage gear 79 and to engage with gear 80 which is driven through the reversing gear 82, in a direction opposite the direction of rotation of shaft 75. The driving connection is disrupted by shifting the clutch 85 to a neutral position between gears 79 and 80.

For making a square turn, while moving in either direction, the clutch of that system on the side toward which the turn is to be made is released, and its associated drum 28 is held by brake band 98 against rotation, thereby locking the shaft 18 at that side against rotation and thus holding the track at that side against moving. The planetary system is free by reason of the brake of the planetary system being released and this prevents driving of the track at that side.

For gradual turning, the brake on the drum of the planetary system at the side toward which the turn is to be made is set, thereby to hold the outer gear of the planetary system from turning. The setting of this brake band automatically releases the clutch at that side by reason of the clutch release mechanism being operatively connected to the brake setting shaft 102 by the mechanism shown in Fig. 4. The driving power from shaft 69 will then be transmitted through the planetary system to the shaft 18 to turn it at a slower speed than that of the system at the opposite side, thus effecting a gradual turn.

In addition to the use of the planetary systems for turning, these provide an additional low gear by driving simultaneously through both systems. The present design provides substantially a five eighths reduction by use of the planetary systems.

Ordinary steering may also be effected when the planetary systems are not in use by slipping the clutch at either side so as to momentarily disrupt the driving connection.

The partition wall 71 divides the housing 1A into two separate compartments and this permits those parts in the rearward compartment to be contained in oil while those in the forward compartment are kept dry; thus to insure most satisfactory operation of the clutch and brake. Suitable packing may be used to prevent leakage between the compartments.

The present mechanism is especially suitable to high speed tractors for the reason that a reduction of speed on either track is progressive and not sudden or violent. Furthermore, there is no loss of power through the turning mechanism. When using the planetary systems in turning, the power for turning is materially lessened. For making pivot turns normal speed of the engine with full power is available. By using both planetary systems, a speed reduction may be obtained and while under planetary speeds, turns can be made by use of the clutch and brake systems.

Having thus described my invention, what I claim as new therein and desire to secure by Letters Patent is—

1. A power transmission mechanism comprising an engine driven shaft, a pair of wheel driving shafts and a transmission unit for each wheel driving shaft comprising a transmission shaft having driving connection with its corresponding wheel shaft, means providing a driving connection between the engine driven shaft and the transmission shaft including a releasable clutch, another driving connection between the engine driven shaft and transmission shaft including a planetary gear system, and brake means selectively operable to effect a direct driving connection with the wheel driving shaft through the clutch or a reduced drive through the planetary system or for effecting an independent holding against rotation of either transmission shaft.

2. A power transmission mechanism comprising an engine driven shaft, a pair of wheel driving shafts and a transmission unit for each wheel driving shaft; each of said units comprising a transmission shaft having a driving connection with its corresponding wheel driving shaft, sleeves rotatable axially about said transmission shafts, each having a connection with the engine driven shaft through which it is driven in unison with the like sleeve of the other unit, a clutch adapted to provide a direct driving connection between each sleeve and transmission shaft, a planetary gear system adapted to provide a reduced driving connection between each sleeve and its corresponding transmission shaft and selective means in each unit for effecting a driving connection through the clutch or through the planetary system and means for holding either of the transmission shafts against rotation while its clutch and planetary systems are inactive.

3. A power transmission and steering mechanism of the character described comprising an engine driven shaft, a pair of wheel driving shafts and a transmission unit associated with each wheel driving shaft; each of said units comprising a transmission shaft having a driving connection with its corresponding wheel driving shaft, a sleeve revoluble about the transmission shaft and having a connection through which it is driven by the said engine driven shaft, a planetary gear system through which the transmission shaft may be driven from the sleeve at a reduced speed, a brake drum fixed on the transmission shaft, a brake band associated with the drum, a clutch operable to effect a direct driving connection between the sleeve and drum, selective means for effecting a driving connection through the clutch or through the planetary system, and control means for selectively applying the brake band to the drum of the two units.

4. A power transmission and steering mechanism of the character described comprising an engine driven shaft, a pair of wheel driving shafts, and a transmission unit associated with each wheel driving shaft; each of said units comprising a transmission shaft having a geared driving connection with its corresponding wheel driving shaft, a sleeve revoluble about the transmission shaft having a geared connection with the engine driven shaft whereby it is driven in unison with the like shaft of the other unit, a releasable clutch mechanism operatively connecting the sleeve and transmission shaft and including a brake drum fixed to the shaft, a braking means associated with the drum for holding the shaft against rotation when the clutch is released, and means for releasing the clutch.

5. A power transmission and steering mechanism of the character described comprising an engine driven shaft, a pair of wheel driving shafts, and a transmission unit associated with each wheel driving shaft; each of said units comprising a transmission shaft having a geared driving connection with its corresponding wheel driving shaft, a sleeve revoluble about the transmission shaft having a geared connection with the engine driven shaft whereby it is driven in unison with the like shaft of the other unit, a releasable clutch mechanism operatively connecting the sleeve and transmission shaft, a planetary gear system comprising a spider fixed to the transmission shaft, a central gear axially revoluble on the shaft, an external ring gear fixed to the sleeve coaxially of the transmission shaft, intermediate gears mounted by the spider in mesh with the central and external gears, a brake drum fixed to the central gear, a braking means associated with said drum, means for releasing the clutch, and means for applying the braking means to the drum of the planetary system.

6. A power transmission and steering mechanism comprising an engine driven shaft, a pair of wheel driving shafts and a transmission unit associated with each wheel driving shaft; each unit comprising a transmission shaft having a geared connection with its respective wheel driving shaft, a sleeve rotatable about the transmission shaft, a clutch connection between the sleeve and transmission shaft and including a drum that is fixed to the shaft, a brake associated with the drum, a planetary gear system interposed between the sleeve and transmission shaft comprising an external gear fixed to the sleeve, a spider keyed on the shaft, intermediate gears on the spider and a central gear revoluble on the shaft, a brake drum fixed to the central gear, a brake band associated with the drum, and control mechanism including individual means for setting the brakes, each of which operates to release the clutch.

7. In a transmission mechanism of the character described in combination, an engine driven shaft, a shaft driven thereby, a reversing gear for the said driven shaft, a pair of wheel driving axles, a transmission unit interposed between each axle and the driven shaft, each unit comprising a transmission shaft operatively connected to its corresponding axle, a brake for holding the shaft against rotation, a sleeve rotatably driven by the said driven shaft, a clutch operable to effect a driving connection between the sleeve and transmission shaft when the brake is released, a planetary gear system providing a reduced speed connection between the sleeve and transmission shaft, a brake for the planetary system and a control means for each unit comprising devices selectively operable for setting either brake and means operable by setting of either brake to release the clutch.

8. In a tractor having driven traction means at its opposite sides through which steering of the tractor may be effected by control of their driven speeds, an engine driven shaft, and a transmission mechanism for each traction means including a transmission shaft effecting a driving connection with the corresponding traction means, means connecting the engine shaft and the transmission shafts for driving the tractor at normal speed, a planetary gear system associated with each transmission shaft; said systems having a driving connection with the engine driven shaft common to both, brakes associated with the planetary systems and independently controllable, and adapted when set to provide for driving both traction means at the same reduced speed, or when released to permit them to run free, independently of the other, and independently releasable clutches in the means connecting the engine shaft and the transmission shafts.

GEORGE E. LAMB.